(12) United States Patent
Janssen et al.

(10) Patent No.: US 7,518,116 B2
(45) Date of Patent: Apr. 14, 2009

(54) X-RAY DETECTOR

(75) Inventors: Silke Janssen, Langensendelbach (DE);
Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 11/798,389

(22) Filed: May 14, 2007

(65) Prior Publication Data
US 2008/0048126 A1 Feb. 28, 2008

(30) Foreign Application Priority Data
May 15, 2006 (DE) .................... 10 2006 022 596

(51) Int. Cl.
*G01T 1/36* (2006.01)
(52) U.S. Cl. ................................. 250/370.09
(58) Field of Classification Search ............. 250/370.09
See application file for complete search history.

(56) References Cited

U.S. PATENT DOCUMENTS

| | | | | |
|---|---|---|---|---|
| 5,943,388 A | * | 8/1999 | Tumer | 378/98.9 |
| 6,246,747 B1 | * | 6/2001 | Wear et al. | 378/98.9 |
| 2005/0105687 A1 | * | 5/2005 | Heismann et al. | 378/98.8 |
| 2007/0023669 A1 | * | 2/2007 | Hefetz et al. | 250/370.14 |

FOREIGN PATENT DOCUMENTS

DE 40 18 859 A1 1/1992

* cited by examiner

*Primary Examiner*—David P Porta
*Assistant Examiner*—Marcus H Taningco
(74) *Attorney, Agent, or Firm*—Harness, Dickey & Pierce, P.L.C.

(57) ABSTRACT

An X-ray detector is disclosed for detecting individual quanta. In at least one embodiment, the X-ray detector includes a plurality of detector elements and an evaluation unit that is connected to the latter for data purposes and is set up in such a way that each detector element is assigned a first energy threshold, wherein in each case one portion of various radiation spectra that can be picked up by the detector element exhibits an energy below the energy threshold, and a further portion of the respective radiation spectrum exhibits an energy above the energy threshold. Further, the energy thresholds of the various detector elements are set in a different fashion in such a way that the ratio between the portion, exhibiting an energy above or below the energy threshold in the case of a first radiation spectrum, of the radiation spectrum and the portion, exhibiting an energy above or below the energy threshold in the case of a second radiation spectrum, of the radiation spectrum is intermatched in the case of the various detector elements.

12 Claims, 2 Drawing Sheets

X-RAY DETECTOR

PRIORITY STATEMENT

The present application hereby claims priority under 35 U.S.C. §119 on German patent application number DE 10 2006 022 596.1 filed May 15, 2006, the entire contents of which is hereby incorporated herein by reference.

FIELD

Embodiments of the invention generally relate to an X-ray detector suitable for detecting individual quanta, and/or to a method for operating an X-ray detector.

BACKGROUND

A detector provided for detecting individual quanta is disclosed, for example, in DE 40 18 859 A1. This detector is provided both for use in undestructive material testing and for use in medical technology, for example in the case of dose distribution measurements.

In the case of radiation detectors that are suitable for detecting the energy of individual events, it is frequently possible to set energy thresholds that define how events are to be categorized, for example below which measured energy a detected event is to be rejected. Such energy thresholds serve the purpose, in particular, of delimiting events to be assigned to a specific radiation source from other events that are not to be registered and would only corrupt the measurement result.

In the case of imaging methods that pick up the energy of individual events in a spatially resolved fashion, artifacts, for example in the form of regular patterns, can occur, depending on the setting of individual energy thresholds. The production of such corruptions of measurement results can be connected to the fact that various areas of a radiation detector are exposed to the striking radiation in a different way that can be described only inadequately with the aid of restricted approaches. Complicated setting operations can be required at the radiation detector in order to avoid such artifacts, which can, for example, be visible as rings on a two-dimensional display.

SUMMARY

In at least one embodiment, the invention enables improved detection of individual quanta when detecting X-radiation.

The X-ray detector of at least one embodiment, enabling the detection of individual quanta, has a number of detector elements, and an evaluation unit that is connected to the latter for data purposes and can be incorporated in a more comprehensive data processing network. The evaluation unit is set up in such a way that each detector element is assigned a first energy threshold, wherein in each case one portion of various radiation spectra that can be picked up by the detector element exhibits an energy below this energy threshold, and a further portion of the respective radiation spectrum exhibits an energy above the energy threshold. The energy thresholds of the various detector elements are set in a different fashion in such a way that the ratio between the portion, exhibiting an energy above or below the energy threshold in the case of a first radiation spectrum, of the radiation spectrum and the portion, exhibiting an energy above or below the energy threshold in the case of a second radiation spectrum, of the radiation spectrum is intermatched in the case of the various detector elements.

In this case, the further portions are preferably brought into relationship with the energy regions above the energy threshold. This has the advantage that noise exerts no influence or only a slight disturbing influence.

Matching of the ratios between the portions of the various radiation spectra limited by the energy threshold specifically set for each detector element is understood here not only as completely equating these quotients determined separately for each detector element. Rather, the situation before the matching of the energy thresholds, that is to say given energy thresholds set identically for all detector elements, is to be compared with the situation after the changing of the energy thresholds:

matching of the quotients that specify the ratio between the number of the events registered when a first radiation spectrum is picked up, and the number of the events registered when a second radiation spectrum is picked up is spoken of as soon as the sum of the deviations of the individual quotients, respectively assigned to a detector element, from the mean quotient of all the detector elements is smaller after the adjustment of the energy threshold of at least a single detector element than in the case of identically set energy thresholds of all the detector elements. Here, registered events are to be understood as events having an energy above the adjustable energy threshold. The quotients assigned to the individual detector elements are ideally set to at least approximately identical values. It has emerged that artifacts in the imaging are avoided with particularly high reliability in this way together with a conscious acceptance of differently set energy thresholds of the individual detector elements.

According to an advantageous development of at least one embodiment, in addition to the previously described first energy threshold the detector elements are respectively assigned a second, higher or upper energy threshold that defines a further criterion in the measurement of the various radiation spectra. In particular, it is thereby possible to further subdivide the energy region. The second, higher threshold can be used to define the energy starting from which an event measured with the aid of the detector element is assigned to a further, third portion of the respective radiation spectrum. By analogy with the setting of the first threshold, the second threshold can also be set specifically for the various detector elements. It is a precondition for this second threshold value setting that the spectra picked up have a limiting energy above the second energy threshold.

Switching over between the first and the second radiation spectra is possible, for example, by changing the voltage of an X-ray source. If the X-ray detector is part of a medical diagnostic device, it is preferable to set the energy thresholds of the individual detector elements by using the same X-ray source as is, in any case, available as the X-ray source in the medical device. The adjustment of the properties of the X-ray diagnostic device that affect imaging, which adjustment is to be undertaken by setting the various energy thresholds of the X-ray detector, is therefore possible without additional outlay on apparatus, for example in the form of an external X-ray source.

A further possibility of changing the energy spectrum of a radiation used to set the energy thresholds is to filter the radiation. It is assumed in this case that even without using an additional filter influencing the radiation spectrum the radiation striking the detector does not have an identical energy spectrum at every location at which a detector element is used to measure. Rather, a spatial dependence of the radiation spectrum can, for example, come about owing to a shape filter in the X-ray system, in particular a medical system, comprising at least one X-ray source and an X-ray detector constructed in the manner of a detector array.

If a filter is introduced into the beam path for the purpose of the variation in the radiation spectrum that is required in the method in order to set the energy thresholds of the individual detector elements, system-induced spatial dependencies of the radiation striking the X-ray detector that may be present are maintained in principle.

For example, the radiation spectrum at the edge of the planar X-ray detector can be hardened, in particular owing to a shape filter present in the X-ray system. As a consequence of this, when there is a uniform setting of the energy thresholds of all the detector elements the ratio between the portion of a first spectrum lying above the energy threshold and the portion of a second spectrum likewise lying above the energy threshold is not identical for all the detector elements. Here, the spectrum without an additional filter is designated as first spectrum, and the spectrum modified by means of the additional filter and/or changing of the voltage of the X-ray source is designated as second spectrum.

In the areas of the X-ray detector that, by comparison with the remaining detector areas, are exposed to radiation which is hardened or changed in another way, both the first spectrum and the second spectrum are changed in relation to the remaining areas of the detector. This change can be described with the aid of the most varied numerical ratios that, for example, classify the ratio between the portion of a spectrum lying below a threshold and the portion of the spectrum lying above this threshold. Surprisingly, a particularly high image quality is attained when the portions of various spectra picked up with the aid of a detector element and lying above settable thresholds are brought into relationship with one another, and the quotient thereby given is used as the target variable, to be matched for the various detector elements, in setting the energy thresholds of the detector elements. The influence of noise is kept weak by the selection of the portions of the spectra lying above the thresholds.

The advantage of at least one embodiment of the invention resides, in particular, in that in the case of a medical diagnostic device that detects individual X-ray quanta it is possible to carry out a setting of energy thresholds of individual detector elements in a simple way by using the existing X-ray source of the diagnostic device. In particular, at least one embodiment of the method enables the detector to be calibrated without the use of a monochromatic radiation, since what is considered is the ratio of two spectra, and therefore a relative variable.

Consequently, during at least one embodiment of the method, the energy thresholds specific to the detector elements are preferably set by using calibration spectra that are not monochromatic. The calibration spectra are selected here in terms of the energy thresholds to be set, that is to say it is preferred to preselect for different energy regions different energy thresholds in relation to which suitable calibration spectra are then selected. The energy thresholds differing specifically by detector element are then determined with the aid of the described method in relation to a respective preselected energy threshold.

BRIEF DESCRIPTION OF THE DRAWINGS

An example embodiment of the invention is explained below in more detail with the aid of the drawings, in which.

DETAILED DESCRIPTION OF THE EXAMPLE EMBODIMENTS

Figure 1:
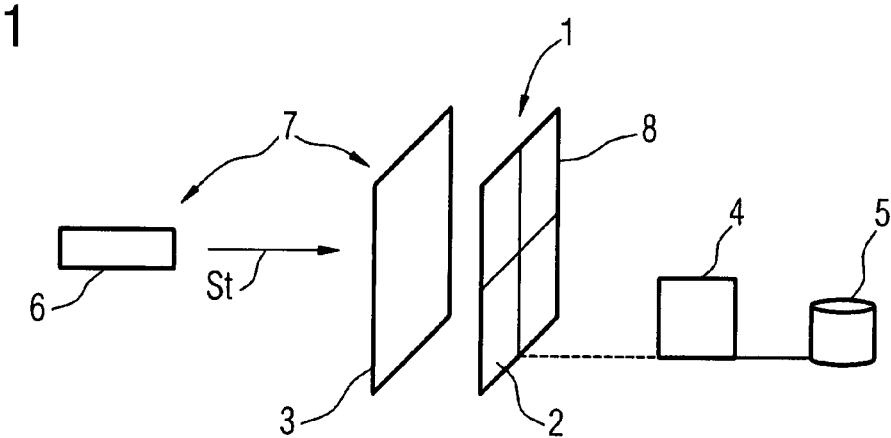
FIG. 1 is a schematic of an X-ray detector including an evaluation unit.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

Illustrated symbolically in FIG. 1 is an X-ray detector 1 that has individual detector elements 2 and a filter 3 placed upstream of the latter, and is connected to an evaluation unit 4 having a data memory 5. Just like an X-ray source 6, the X-ray detector 1 is part of a medical diagnostic device 7 (not illustrated further). This is preferably a computed tomography device.

The detector elements 2 arranged in the manner of a detector array 8 enable individual X-ray quanta to be detected with spatial and energy resolution. In a departure from the schematic illustration, the evaluation unit 4 and the data memory 5 provided for storing data acquired by means of the diagnostic device 7 can be parts of a more comprehensive data processing network, for example a radiology information system (RIS).

Figure 2:
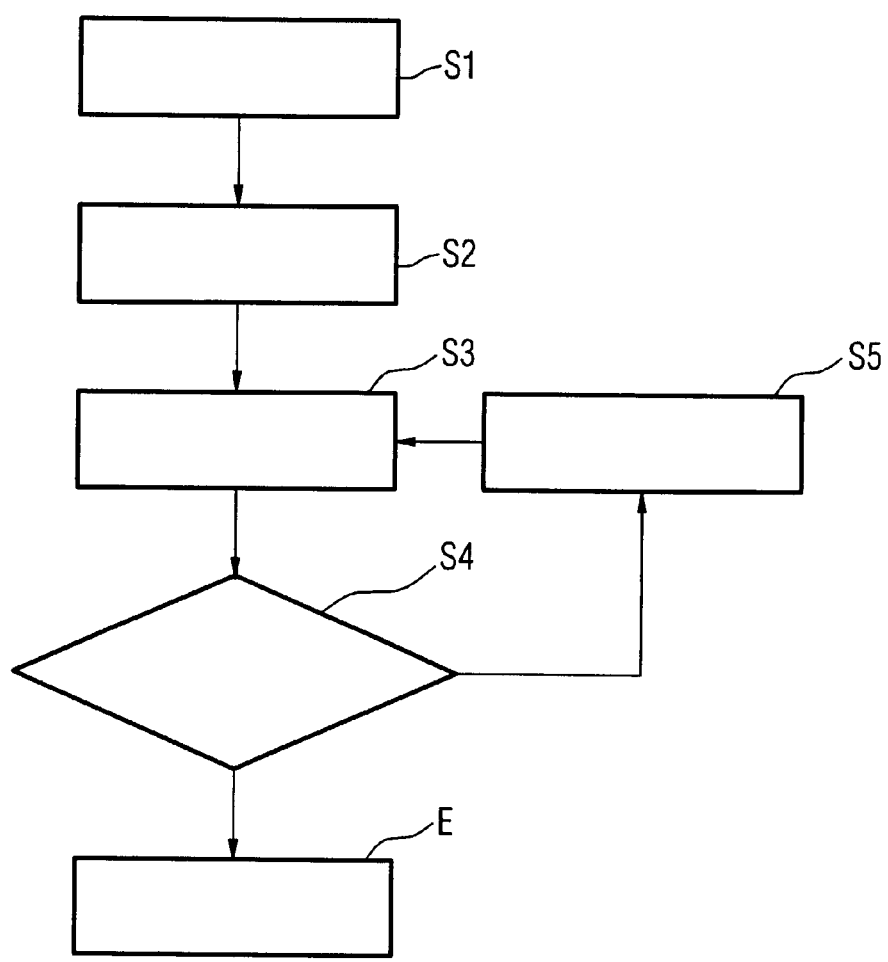
FIG. 2 shows a flowchart of a method for setting energy thresholds of the X-ray detector according to FIG. 1, and FIGS. 3 and 4 show various spectra that can be picked up with the aid of the X-ray detector according to FIG. 1.

Energy thresholds e1, e2 (FIG. 3, FIG. 4) that can be implemented as hardware and/or software are assigned to each detector element 2. Setting of the lower energy threshold e1 is explained below with the aid of FIG. 2.

In a first step S1, the X-ray detector 1 is exposed to a radiation St having a first energy spectrum Sp1 by means of the X-ray source 6. One portion of this energy spectrum Sp1 lies below, while a further portion of the spectrum Sp1 lies above the energy threshold e1, which in this step S1 is identical for all the detector elements 2. Each detector element 2 supplies a separate signal to the evaluation unit 4. Channels k of the X-ray detector 1 that correspond in each case to one detector element 2 are also spoken of. The events detected during step S1 by means of the detector elements 2 are stored in the data memory 5. The number of the events registered by each detector element 2, that is to say in each channel k, that have an energy above the first threshold e1 is denoted by s1(k). As a rule, the numbers s1(k) differ for the various detector elements 2.

In the next step S2, a second measurement is carried out with the aid of the X-ray detector 1 in conjunction with unchanged energy thresholds e1, but with changed radiation spectrum S2. This measurement supplies for each detector element 2 a number s2(k) that specifies how many events have been registered that have an energy above the energy threshold e1. The number s2(k) of the events registered with the aid of the second radiation spectrum S2, which likewise has fractions above and below the first energy threshold e1, is also generally a function of the position of the detector element 2 inside the detector array 8.

The third step S3 is carried out with the aid of the evaluation unit 4 after the termination of the second step S2: for each detector element 2, that is to say for each channel k, a quotient r(k)=s1(k)/s2(k) is determined that specifies the ratio between the number of the events recorded in the first step S1 and having an energy above the first energy threshold e1, and the number of the events recorded in the second step S2 and likewise having an energy above the first energy threshold e1.

In the following step S4, there is an automatic interrogation as to whether the quotients r(k) for the various detector elements 2 satisfy a prescribeable criterion, in particular lie within a permissible interval around the mean quotient r of all the channels k. If this criterion is not yet satisfied, the energy threshold e1 of at least one detector element 2 is adjusted in step S5 in order to displace the quotient r(k) of the corresponding channel k in the direction of the mean quotient r.

If, for example, the ratio r(k) of a specific channel k is too small by comparison with the mean quotient r, the second spectrum Sp2 having originated from the first spectrum Sp1 by hardening, this means that by comparison with the detection of radiation of relatively low energy the relevant detector element 2 supplies excessively high counting rates in the detection of higher-energy radiation. This disparity in the number of events registered in different energy regions can be corrected by lowering the energy threshold e1 of the detector element 2. The percentage rise in the events registered in the first spectrum Sp1, corresponding in each case to an individual X-ray quantum, is greater in the case of such a lowering of the energy threshold e1 than the percentage rise in the number of the events that are registered during the measurement of the second spectrum Sp2. The quotient r(k)=s1(k)/s2(k) is consequently increased, that is to say it approaches the mean quotient r.

With the changed setting of the energy threshold e1(k) of at least one detector element 2 and preferably of a number of detector elements 2, the associated quotient r(k) is determined anew in step S3 for the various detector elements 2, it also being possible to carry out renewed measurements. Subsequently, there is an interrogation in step S4 once again as to whether the criterion is satisfied with regard to the correspondence of the quotients r(k) assigned to the individual detector elements 2. The end E of the method for setting the energy thresholds e1(k) of the detector elements 2 is reached if this is the case. Ideally, all the energy thresholds e1(k) are set in such a way that the associated quotients r(k) are adjusted to an identical value. In a departure therefrom, it is also possible merely to smooth the curve r(k) that has a spatial dependence inside the detector array 8. Such a smoothing is sufficient in many cases in order to avoid the formation of artifacts on images picked up with the aid of the X-ray detector 1.

Figure 3:
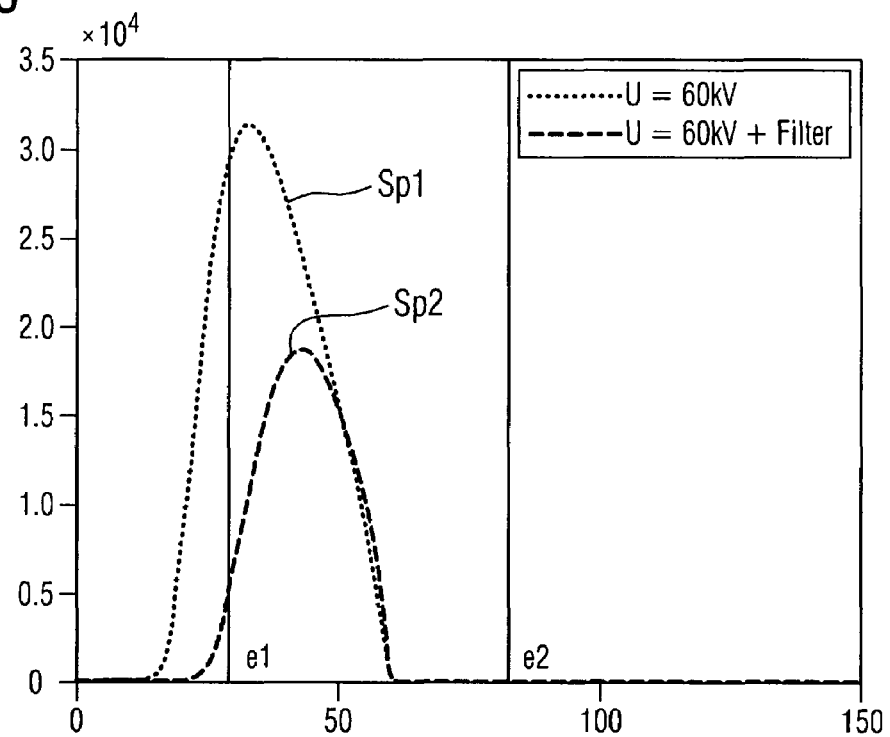
Figure 4:
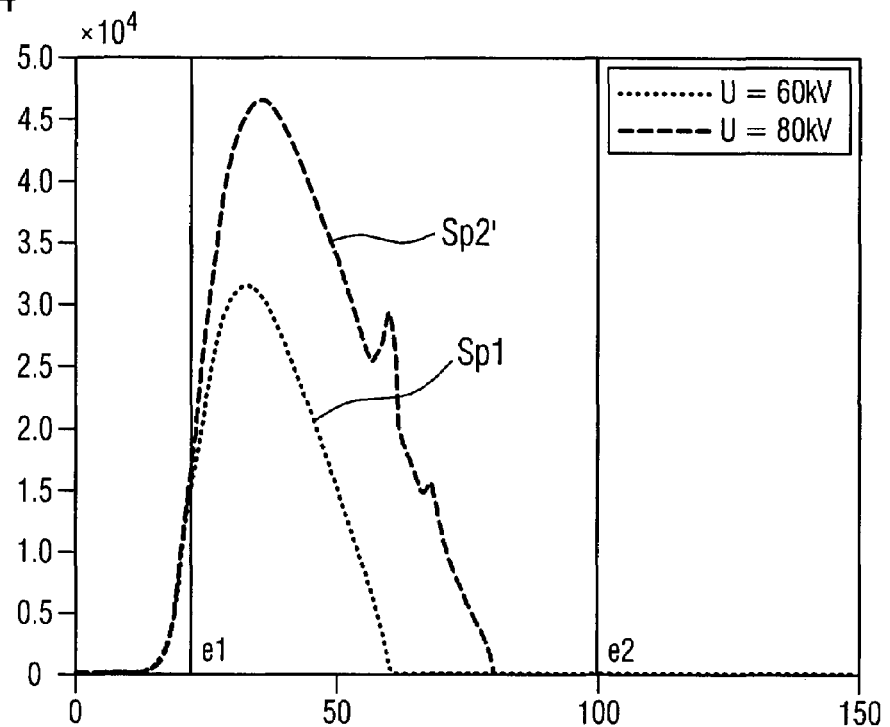

FIGS. 3 and 4 respectively show the first energy spectrum Sp1 of the radiation St produced with the aid of the X-ray source 6, and a second spectrum Sp2, Sp2' changed in comparison with the first spectrum Sp1. In the two cases, both the first radiation spectrum Sp1 and the second radiation spectrum Sp2, Sp2' have fractions below the first energy threshold e1 and fractions above the energy threshold e1. Since the X-ray detector 1 is a counting detector, numbers of events can be assigned to the various portions of the spectra Sp1, Sp2, Sp2'. Here, the number s1(k) dependent on the detector channel k corresponds to the portion of the first spectrum Sp1 lying above the energy threshold e1, and the number s2(k) corresponds to the portion of the second spectrum Sp2 lying above the threshold e1.

The second spectrum Sp2 illustrated in FIG. 3 is produced from the first spectrum Sp1 by filtering by means of the filter 3. The voltage used to operate the X-ray source 8 remains constant in this case at 60 kV. By contrast, in the case illustrated in FIG. 4 the spectrum Sp2' has not originated from the spectrum Sp1 by means of a filter, but by raising the voltage from 60 kV to 80 kV.

As may be seen from FIGS. 3 and 4, the limiting energy of all the spectra Sp1, Sp2, Sp2' lies below the second energy threshold e2. In this case, there is no need to heed the second energy threshold e2 when setting the first energy thresholds e1(k) of the individual detector elements 2. On the other hand, in the case of a second energy threshold e2 lying inside the second energy spectrum Sp2, Sp2' or inside the first energy spectrum Sp1, it would need to be possible to raise the second energy threshold e2 when setting the first energy thresholds r1(k). Otherwise, the upper, second energy threshold e2(k) can be set separately for each detector element 2 by analogy with the first-energy threshold e1(k).

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray detector for detecting individual quanta, comprising:
   a plurality of detector elements; and
   an evaluation unit, connected to the detector elements, set up to assign each detector element a first energy threshold, wherein, in each case, one portion of various radiation spectra detectable by at least one of the detector elements exhibits an energy below the energy threshold and a further portion of the respective radiation spectrum exhibits an energy above the energy threshold, and wherein the energy thresholds of the various detector elements are set in a different fashion such that the ratio between the portion, exhibiting an energy above or below the energy threshold in the case of a first radiation spectrum, of the radiation spectrum and the portion, exhibiting an energy above or below the energy threshold in the case of a second radiation spectrum, of the radiation spectrum is intermatched in the case of the various detector elements.

2. The X-ray detector as claimed in claim 1, wherein the detector elements are respectively assigned a second, upper energy threshold, which defines the energy starting from which an event measured with the aid of the detector element is assigned to a further, third portion of the respective radiation spectrum.

3. The X-ray detector as claimed in claim 2, wherein the second, upper energy threshold is deactivatable.

4. The X-ray detector as claimed in claim 3, further comprising:
   a filter, placed upstream of the detector elements to influence the radiation spectra.

5. The X-ray detector as claimed in claim 2, further comprising:
   a filter, placed upstream of the detector elements to influence the radiation spectra.

6. The X-ray detector as claimed in claim 1, further comprising:
   a filter, placed upstream of the detector elements to influence the radiation spectra.

7. The X-ray detector as claimed in claim 1, wherein there is a functional relationship between the arrangement of a detector element inside a detector array and the radiation spectrum at the location of the respective detector element.

8. A method for operating an X-ray detector including a plurality of detector elements suitable for detecting individual quanta, the method comprising:
   exposing the detector elements to a radiation exhibiting a first energy spectrum, a first energy threshold lying inside the first energy spectrum existing for each detector element;
   detecting a number of events, detected with each respective detector element, with the aid of an energy above or below the first energy threshold and storing the detected number as a first number;
   exposing the detector elements to a radiation exhibiting a second energy spectrum, the first energy threshold of each detector element remaining unchanged;
   detecting a second number of events, detected with the aid of each detector element, with the aid of an energy above or below the first energy threshold and storing the detected second number as a second number;
   forming a quotient for each detector element from the first number and the second number; and
   changing the first energy thresholds of at least a portion of the detector elements to match quotients for the individual detector elements.

9. The method as claimed in claim 8, wherein the quotients are set to at least approximately identical values for the individual detector elements by way of the different setting of the first energy threshold of various detector elements.

10. The method as claimed in claim 9, wherein the energy thresholds are set by using an X-ray source that forms a part of a diagnostic device, including the X-ray detector.

11. The method as claimed in claim 8, wherein the energy thresholds are set by using an X-ray source that forms a part of a diagnostic device, including the X-ray detector.

12. A computer readable medium including program segments for, when executed on a computer device, causing the computer device to implement the method of claim 8.

* * * * *